United States Patent
Keidar et al.

(10) Patent No.: US 9,798,887 B2
(45) Date of Patent: Oct. 24, 2017

(54) COMPUTING DEVICE TO SECURELY ACTIVATE OR REVOKE A KEY

(71) Applicant: QUALCOMM Incorporated, San Diego, CA (US)

(72) Inventors: Ron Keidar, San Diego, CA (US); Yau Chu, Milpitas, CA (US); Xu Guo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 14/836,651

(22) Filed: Aug. 26, 2015

(65) Prior Publication Data

US 2017/0060595 A1    Mar. 2, 2017

(51) Int. Cl.
| | |
|---|---|
| *G06F 21/62* | (2013.01) |
| *G06F 9/44* | (2006.01) |
| *G06F 21/57* | (2013.01) |
| *H04L 9/30* | (2006.01) |
| *H04L 9/08* | (2006.01) |
| *H04L 9/32* | (2006.01) |

(52) U.S. Cl.
CPC .......... *G06F 21/62* (2013.01); *G06F 9/4401* (2013.01); *G06F 21/575* (2013.01); *H04L 9/0891* (2013.01); *H04L 9/30* (2013.01); *H04L 9/3268* (2013.01)

(58) Field of Classification Search
CPC .............................. G06F 21/62; G06F 21/575
See application file for complete search history.

(56) References Cited

U.S. PATENT DOCUMENTS

| | | | |
|---|---|---|---|
| 4,558,176 A * | 12/1985 | Arnold | G06F 21/10 380/29 |
| 4,972,472 A | 11/1990 | Brown et al. | |
| 7,783,884 B2 * | 8/2010 | Nakano | H04L 63/0442 713/175 |
| 8,019,084 B1 * | 9/2011 | Zajkowski | G06Q 20/3552 235/379 |

(Continued)

FOREIGN PATENT DOCUMENTS

WO    2011072949 A1    6/2011

OTHER PUBLICATIONS

Zheng et al.; Trusted Computing-Based Security Architecture for 4G Mobile Networks; Published in: Parallel and Distributed Computing, Applications and Technologies, 2005. PDCAT 2005. Sixth International Conference on; Date of Conference: Dec. 5-8, 2005; IEEE Xplore.*

(Continued)

*Primary Examiner* — Bradley Holder
(74) *Attorney, Agent, or Firm* — Blakely, Sokoloff, Taylor & Zafman

(57) ABSTRACT

Disclosed is an apparatus and method to securely activate or revoke a key. For example, the apparatus may comprise: a storage device to store a plurality of pre-stored keys; a communication interface to receive an activate key command and a certificate associated with one of the pre-stored keys; and a processor. The processor may be coupled to the storage device and the communication interface and may be configured to: implement the activate key command to reboot the apparatus with the pre-stored key and the certificate; and determine if the reboot is successful.

19 Claims, 6 Drawing Sheets

(56) References Cited

U.S. PATENT DOCUMENTS

| | | | | |
|---|---|---|---|---|
| 8,560,823 | B1* | 10/2013 | Aytek | G06F 8/665 |
| | | | | 713/191 |
| 8,775,812 | B2* | 7/2014 | Belrose | G06F 21/305 |
| | | | | 713/176 |
| 2007/0192610 | A1 | 8/2007 | Chun et al. | |
| 2010/0030897 | A1* | 2/2010 | Stradling | G06F 21/572 |
| | | | | 709/225 |
| 2010/0169633 | A1 | 7/2010 | Zimmer et al. | |
| 2010/0275027 | A1* | 10/2010 | Belrose | G06F 21/305 |
| | | | | 713/176 |
| 2013/0091345 | A1 | 4/2013 | Shroff et al. | |
| 2013/0111203 | A1 | 5/2013 | Baltes et al. | |
| 2014/0181498 | A1* | 6/2014 | Rhee | G06F 21/57 |
| | | | | 713/2 |
| 2015/0007262 | A1* | 1/2015 | Aissi | G06F 21/60 |
| | | | | 726/2 |

OTHER PUBLICATIONS

Di Raimondo et al.; Secure off-the-record messaging; Published in: Proceeding WPES '05 Proceedings of the 2005 ACM workshop on Privacy in the electronic society; pp. 81-89; 2005; ACM Digital Library.*

International Search Report and Written Opinion—PCT/US2016/042605—ISA/EPO—dated Oct. 6, 2016.

\* cited by examiner

| PHASE | ACTIVE RoT | ACTIVATE CMD | REVOKE CMD |
|---|---|---|---|
| CURRENT PHASE | 1 | 0 | 0 |
| ACTIVE KEY2 AND REPLACE CERTIFICATE TO RoT #2 | 1 | KEY#2 | 0 |
| BOOT WITH RoT #2 VERIFY BOOT SUCCESS | 1,2 | 0 | 0 |
| SUCCES: REVOKE RoT #1 | 2 | 0 | KEY#1 |
| FAILURE: RESUME RoT1 #1 CERTIFICATE | 1,2 | 0 | 0 |

FIG. 4

COMPUTING DEVICE TO SECURELY ACTIVATE OR REVOKE A KEY

BACKGROUND

Field

The present invention relates to a computing device that securely activates or revokes a key.

Relevant Background

Modern computing devices often apply a procedure of secure boot. This common procedure is typically employed by anchoring a public key to the hardware and to chain it to the application software by a signed certificate that holds the hash of the entire software application image. The public key may be paired with a private key that resides in secure server such that no one can access the private key and the private key may generate signed certificates to allow for new software application upgrades to run on the computing devices.

Unfortunately, cases have arisen, in which, a private key has been compromised, and, in such events, a company may lose control of its computing devices. As an example, a hacker that has hacked the private key may transmit their own software application images to the computing device to gain control of the computing device (e.g., to violate a user's privacy).

SUMMARY

Disclosed is an apparatus and method to securely activate or revoke a key. For example, the apparatus may comprise: a storage device to store a plurality of pre-stored keys; a communication interface to receive an activate key command and a certificate associated with one of the pre-stored keys; and a processor. The processor may be coupled to the storage device and the communication interface and may be configured to: implement the activate key command to reboot the apparatus with the pre-stored key and the certificate; and determine if the reboot is successful. In one embodiment, if the reboot is successful, the processor is configured to store the certificate for further reboots and to issue a revoke key command to revoke the previously used pre-stored key.

BRIEF DESCRIPTION OF THE DRAWINGS

FIG. 4 is a diagram illustrating a process to determine if a new key is activated.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "computing system or device" refers to any form of computing device including but not limited to laptop computers, tablets, smartphones, televisions, desktop computers, home appliances, cellular telephones, watches, wearable devices, Internet of Things (IoT) devices, personal television devices, personal data assistants (PDAs), palm-top computers, wireless electronic mail receivers, multimedia Internet enabled cellular telephones, Global Positioning System (GPS) receivers, wireless gaming controllers, automotive devices, interactive game devices, notebooks, smartbooks, netbooks, mobile television devices, cameras, infotainment devices, gateways, etc., or any computing device or data processing apparatus. It should be appreciated that terms computing device, computing system, apparatus, etc., may be used interchangeably.

Figure 1:
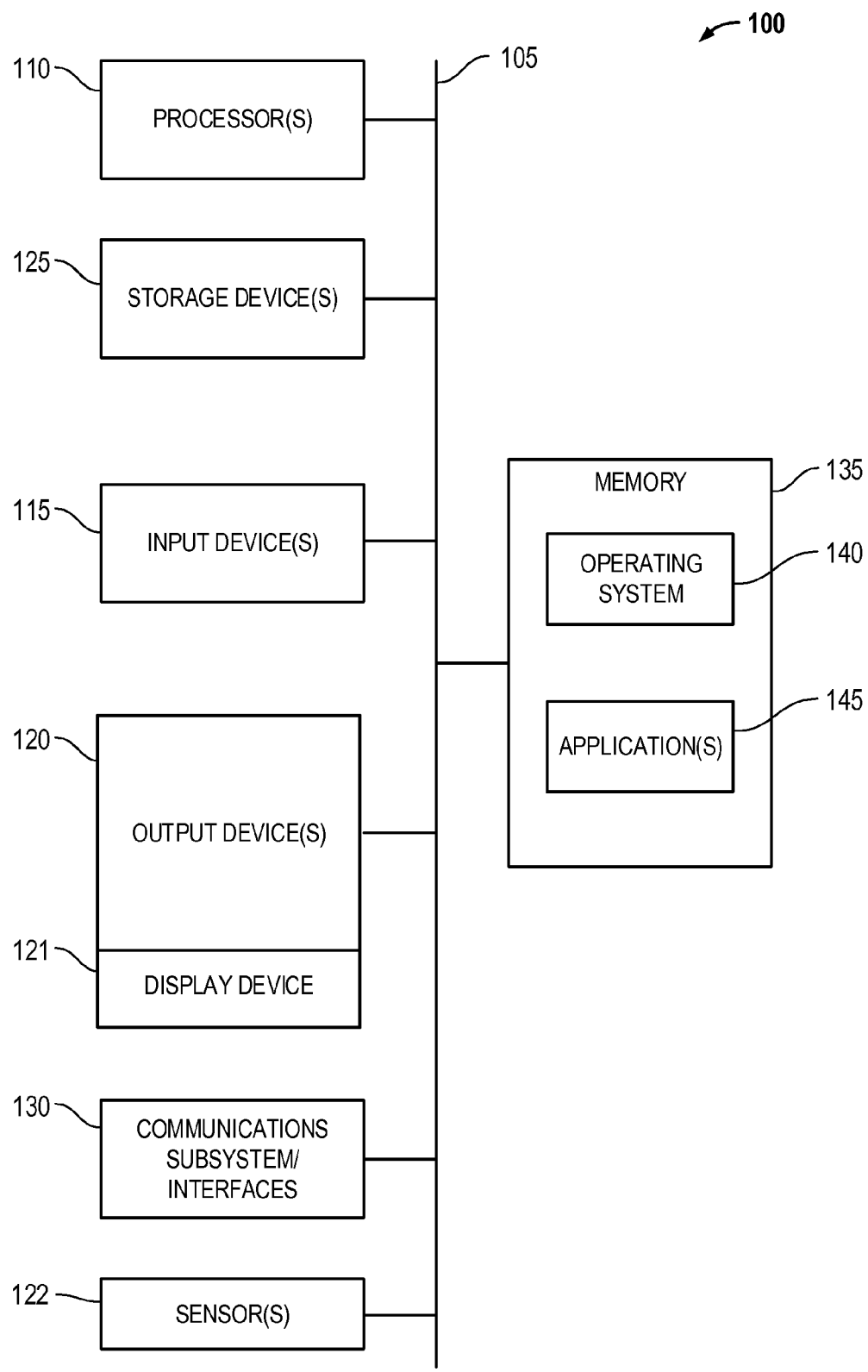
FIG. 1 is a diagram of a computing device in which embodiments may be practiced.

An example computing device 100 that may be utilized to activate a certificate, as will be hereinafter described in detail, is illustrated in FIG. 1. The computing device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115 (e.g., keyboard, keypad, touchscreen, mouse, etc.); one or more output devices 120, which include at least a display device 121, and can further include without limitation a speaker, a printer, and/or the like. Additionally, computing device 100 may include a wide variety of sensors 122. Sensors 122 may include: a clock, an ambient light sensor (ALS), a biometric sensor (e.g., blood pressure monitor, etc.), an accelerometer, a gyroscope, a magnetometer, an orientation sensor, a fingerprint sensor, a weather sensor (e.g., temperature, wind, humidity, barometric pressure, etc.), a Global Positioning Sensor (GPS), an infrared (IR) sensor, a proximity sensor, near field communication (NFC) sensor, a microphone, a camera. It should be appreciated that computing device 100 may include any type of sensor. In one embodiment, the hardware elements that may be utilized in the activation and revocation functions, to be hereinafter described, may include secure processors, hardware security cores, crypto-engines, etc.

The computing device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device 100 may also include a communication subsystem and/or interface 130, which can include without limitation a mode, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem and/or interface 130 may permit data to be exchanged with a network, other computer systems, and/or any other devices described herein. In many embodiments, the computing device 100 will further comprise a working memory 135, which can include a RAM or ROM device, as described above.

The computing device 100 may also comprise firmware elements, software elements, shown as being currently located within the working memory 135, including an operating system 140, applications 145, device drivers, executable libraries, and/or other code. In one embodiment, an application may be designed to implement methods, and/or configure systems, to implement embodiments, as described herein. Merely by way of example, one or more procedures described with respect to the method(s) discussed below may be implemented as code and/or instructions executable by a computing device (and/or a processor within a computing device); in an aspect, then, such code and/or instructions can be used to configure and/or adapt a computing device 100 to perform one or more operations in accordance with the described methods, according to embodiments described herein.

A set of these instructions and/or code might be stored on a non-transitory computer-readable storage medium, such as the storage device(s) 125 described above. In some cases, the storage medium might be incorporated within a computer system, such as computing device 100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware, software, or combinations thereof, to implement embodiments described herein. Further, connection to other computing devices such as network input/output devices may be employed.

Aspects may relate to an apparatus and method to activate a new certificate for computing device 100. In particular, aspects may relate to an apparatus or method to transition to a new Root-of-Trust (RoT) utilizing a pre-stored key stored on the computing device 100 and a new certificate transmitted to the computing device 100 from a server.

In one embodiment, as will be described in more detail hereinafter, computing device 100 may include a plurality of pre-stored keys and a communication interface 130. The storage device 125 may store the plurality of pre-stored keys. Various types of storage devices for the plurality of pre-stored keys will be hereinafter described. The communication interface 130 may receive an activate key command and a certificate associated with one of the pre-stored keys (e.g., hereinafter referred to as a new certificate) from a remote server. It should be noted that the new certificate is signed by the new key, and is not the new key itself. In other words, a key is activated that may already be on the computing device 100 but was inactive. Once active, the associated certificate needs to be replaced in order to work with the new key, as will be described. As previously described, processor 110 may be coupled to the storage device 125 and the communication interface 130. Processor 110 of computing device 100 may be configured to: implement the activate key command to reboot computing device 100 with the pre-stored key of the computing device and the new certificate received from the server. If the reboot is successful, processor 110 may be configured to store the new certificate for further reboots in conjunction with utilizing the pre-stored key and may revoke the use of the previously used pre-stored key. On the other hand, if the reboot is not successful, processor 110 may be configured to resume operations with the previously used pre-stored key and the corresponding previously used certificate. In one embodiment, processor 110 may be a particular type of processing hardware element, which may be utilized in the activation and revocation functions, to be hereinafter described, such as a secure processor, a hardware security core, a crypto-engine, etc.

Figure 2:
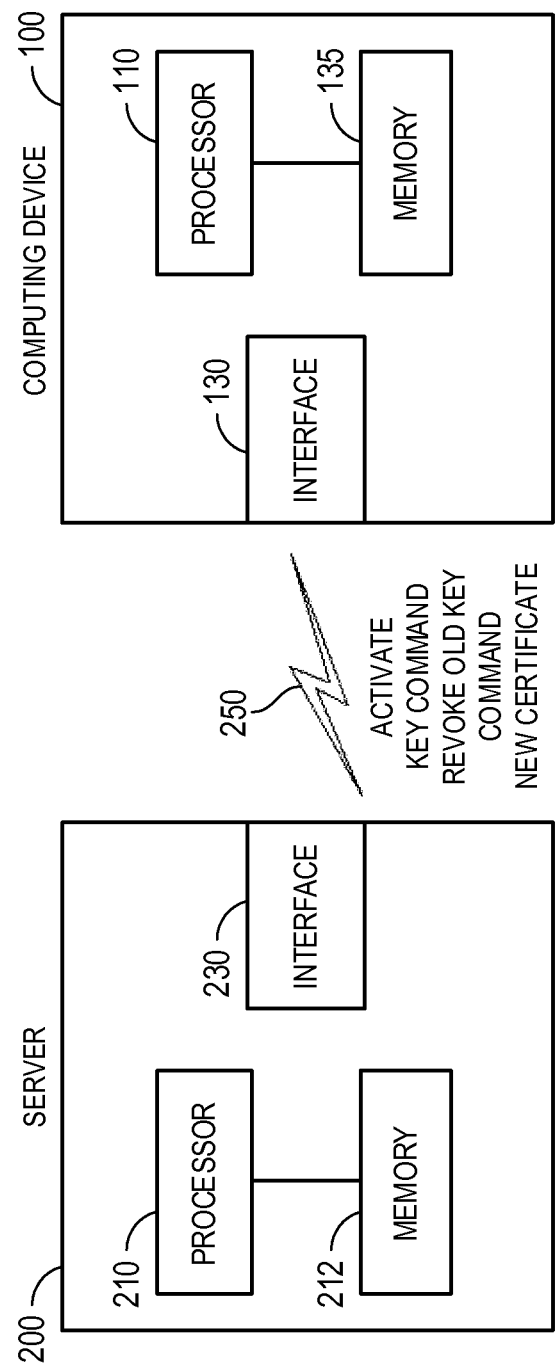
FIG. 2 is a diagram of a system in which embodiments may be practiced.

With additional reference FIG. 2, computing device 100 is shown in conjunction with a remote server 200. Remote server 200 may include a processor 210, a memory 212, and a communication interface 230 to communicate with computing device 100. In one embodiment, server 200 may be a suitable computing device to transmit: activate key commands; revoke old key commands; and new certificates—via a wireless or wired link 250 to computing device 100. These commands will be discussed in more detail hereafter. It should be appreciated that server 200 may be an appropriate computing device with a processor, memory, and communication interface to perform these functions. Further, it should be appreciated that server 200 should have some sort of secret to enable these types of commands with the computing device 100. For example, the new certificate may be signed by a private key of the server 200 that is associated with one of the pre-stored public keys of the computing device 100. Thus, a public key may be paired with a private key that resides in secure server 200. This is one type of asymmetric public/private encryption technique that may be utilized. However, it should be appreciated that any suitable type of asymmetric or symmetric technique(s) may be utilized.

Computing device 100 via communications interface 130 may receive the activate key commands; the revoke old key commands; and the new certificates through link 250. Under the control of processor 110, computing device 100 may implement the activate key command. The activate key command may include commanding the reboot of computing device 100 with a new pre-stored key stored on the computing device and the new certificate received from server 200. Computing device 100 may then determine if the reboot was successful. If the reboot was successful, processor 110 may further command the storage of the new certificate for further reboots in conjunction with the use of the new pre-stored key and may also revoke the previously used pre-stored key. On the other hand, if the reboot was not successful, processor 110 may be configured to resume operations with the previously used pre-stored key and the corresponding previously used certificate.

Figure 3:
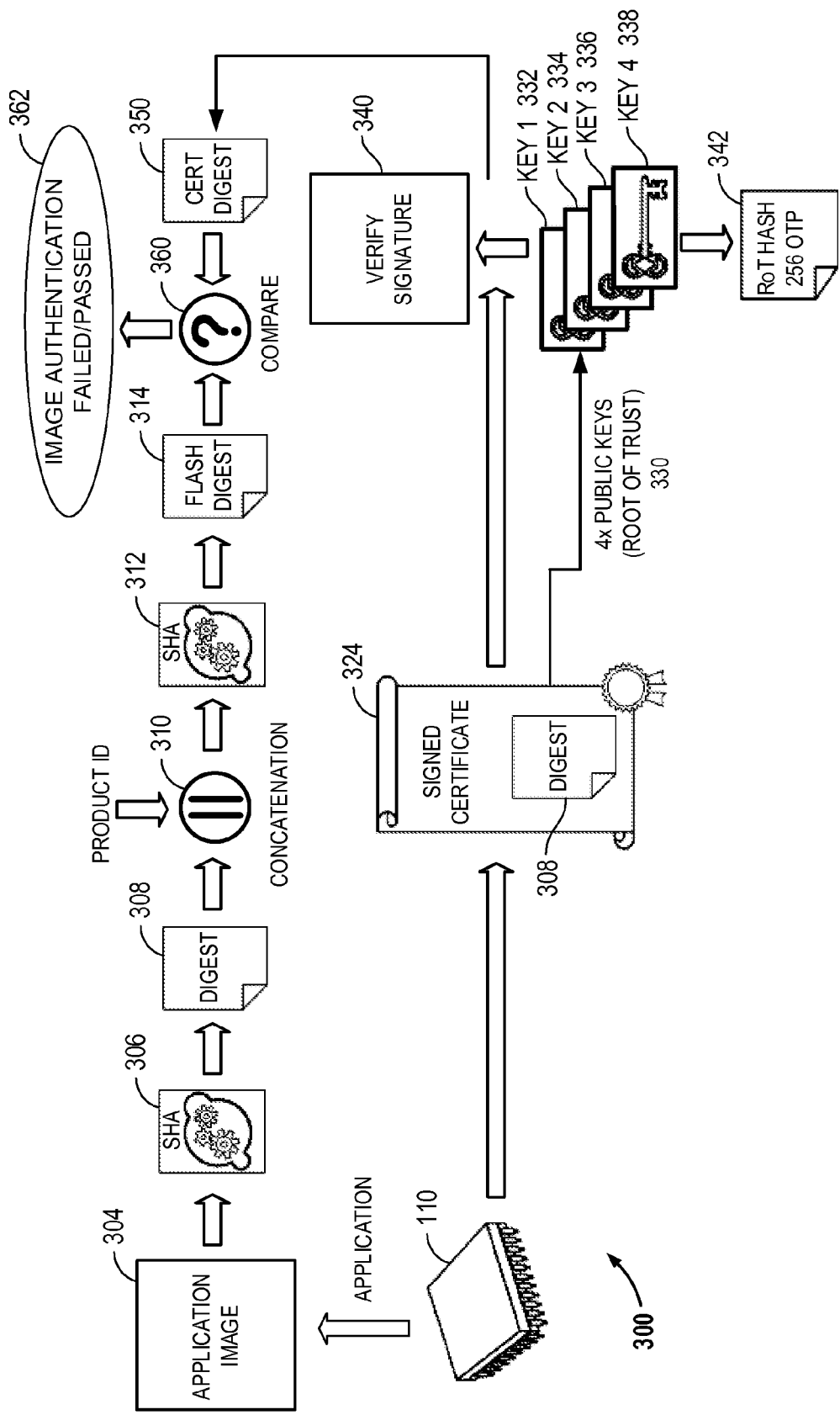
FIG. 3 is a diagram showing a boot process that is authorized or not authorized.

An example 300 may be provided with additional reference to FIG. 3. As an example, an application (e.g., an operating system or a particular application for a remote computing device) may be booted up. As shown in FIG. 3, during boot up by processor 110, a secure hashing algorithm 306 may be applied to the application image 304 to created digest 308. Next, the first iteration of the application digest 308 may be concatenated 310 with a product ID and this value may undergo a further secure hashing algorithm 312 to calculate flash application digest 314. Further, processor 110 may calculate certificate digest 350 based upon signed certificate 324 being decrypted by one of the public keys of the Root of Trust (RoT) 330. For example, four public keys are shown: Public Key 1 332, Public Key 2 334, Public Key 3 336, and Public Key 4 338. In this example, a first previously used pre-stored public key (Key 1 332) is utilized to generate certificate digest 350. The signature may be verified with a hash 342 (Block 340). In any event, processor 110 implements a compare function 360 to compare the flash digest 314 versus the certificate digest 350, and if the image authentication matches, the application is authenticated (Passed 362) and allowed to boot (e.g., proceed with the boot or run code from the authenticated image 304). Whereas, if not, the authentication fails (Failed 362), and the application is not allowed to boot. Thus, a reboot of an application is either successful or not successful.

As has been previously described, there have unfortunately been cases in which private keys have been compromised, and in such events, control of the computing device may be lost. As an example, a hacker that has hacked the private key may transmit their own software application images to the computing device to gain control of the computing device (e.g., to violate a user's privacy).

According to one embodiment, an activate key command and a new certificate may be sent to a computing device 100 by server 200 such that a pre-stored public key already stored in the computing device 100 in conjunction with the new certificate 324 may be utilized to control the boot up of the application.

In this embodiment, with additional reference to FIG. 4, a process 400 may be implemented in which a new signed certificate 324 and a new pre-stored public key (e.g., public key 2 334) may be utilized. For example, process 400 illustrates the different types of phases that may be implemented. To begin with, the current phase 402, illustrates the previous procedure in which the original Root-of-Trust (RoT) is utilized and an activate key command and a revoke key command are not implemented (e.g., marked with 0).

In accordance with this example, processor 110 may implement an activate key command phase 404 in which a new pre-stored public key (e.g., public key 2 334) is utilized along with a new received signed certificate 324 sent from the server 200. In phase 404, a new public key (public key 2 334) is activated and the old signed certificate is replaced with a new signed certificate 324 received from server 200. It should be appreciated that appropriate passwords and signatures or other cryptographic means may be utilized to enable this. Next, at phase 406, processor 110 performs a reboot with the RoT 300 utilizing public key 2 334 and the new signed certificate 324, and determines if it is successful. It should be appreciated that appropriate passwords and signatures may be utilized to enable this. As an example, with reference to FIG. 3, in this instance, processor 110 commands a reboot of the computing device to reboot an application, with the new signed certificate 324 received from server 200. An application image 304 again has a secure hash algorithm 306 applied to calculate digest 308 to which a product ID is concatenated and this data again has another secure hash algorithm 312 applied to calculate flash digest 314. Further, processor 110 calculates certificate digest 350 based upon the new signed certificate 324 being decrypted by newly activated public key 2 334 to generate certificate digest 350. The signature may be verified with a hash 342 (Block 340). In any event, processor 110 implements a compare function 360 to compare the flash digest 314 versus the certificate digest 350, and if the image authentication matches, the application is authenticated (Passed 362) and allowed to boot. Whereas, if not, the authentication fails (Failed 362), and the application is not allowed to boot. Thus, a reboot of an application is either successful or not successful. In this way, whether the new signed certificate 324 and the newly activated public key 2 334 are successful for reboot is tested.

If the reboot is successful, at phase 408, new signed certificate 324 is permanently stored by processor 110 and utilized for all further reboots and public key 2 334 of the RoT is activated. Further, the public key 1 332 of the RoT is revoked by a revoke command and is deleted or invalidated and cannot be used again, as will be described in more detail hereinafter. On the other hand, at phase 410, if the reboot is not successful, processor 110 is configured to resume operations with the previously used pre-stored public key 1 332 of the RoT and the corresponding previously used signed certificate. In this way, if for some reason the reboot of an application with the new signed certificate is not successful, the older current phase 402 may simply be utilized with the original public key and the original signed certificate.

It should be appreciated that during the previously described procedure two or more of the pre-stored keys (e.g., key 1 332 and key 2 334) may be simultaneously active. In this way, activation and revocation may be separated. Also, it should be appreciated that although an example of an activation phase followed by a revocation phase has been described, it should be appreciated that any suitable ordering may be utilized, such as, a revocation phase and then an activation phase, or any suitable ordering. Additionally, multiple active keys and revoked keys may be utilized during the process, the previously described process being just one example, whereas any suitable process may be utilized. Further, it should be appreciated that the processor 110 (e.g., secure processor, a hardware security core, a crypto-engine, etc.) may be configured to prevent unauthorized activate key commands and unauthorized revoke key commands. For example, the activate and revoke key commands may be signed with appropriate private keys at the server 200 and authorized with appropriately paired public keys by the processor 110 of the computing device 100. However, it should be appreciated that any suitable authorization technique for the authentication of the activate and revoke key commands may be utilized, in hardware or software.

By utilizing this methodology, process 400 achieves a safe root transition without relying on any communication during the transition (which may be sensitive to failures) and does not rely on flash memory area to store multiple application images (which may also be sensitive to failures or limited in size). It should be appreciated that this functionality may be useful for remote Internet of Things (IoT) devices that have limited memory and processing capability (e.g., thermostats, lights, remote sensors, smoke detectors, etc.) Thus, in instances when the computing device is a remote device, such as an IoT device, this process may be very useful.

In particular, for remote computing devices 100, such as IoT devices, in which these operations may be implemented remotely based upon activation commands from a remote server 200, without any human assistance, and in many cases, without the owner even being aware of these operations, the use of a new public key and a new signed certificate may be utilized in cases where the private key may have been leaked and a hacker could potentially control these remote computing devices. It should be appreciated that, in the operation of IoT devices, this implementation may cover millions of remote devices. Thus, the activation command for the use of a new signed certificate and a new public key should always occur successfully with a fall back, as described in the previous process, such that "dead"

devices are not a probable occurrence. In this way, embodiments of the previously described process, by separating the revocation of the old public key from the activation of the new public key, and allowing for a safe stage in which the computing device decides that the new public key is successful and, only if it successful, will the old public key be revoked provides a very beneficial implementation. Even if the new signed certificate and new public key fail, the old public key and old signed certificate may be relied upon.

It should be appreciated that the previously described communication interfaces of the computing device 100 and the server 200 may be wireless interfaces in which the activate key command, the new signed certificate, and the revoke old key command are transmitted through a wireless link 250. This may be the case when computing devices 100 are remote devices, such as IoT devices, with limited memories and processors, and this may include millions of different remote devices. However, it should be appreciated that wired links may also be utilized. Additionally, it should be appreciated that the previously described process may be utilized for any type of computing device and the previous descriptions are merely examples. Also, it should be appreciated that, once a reboot has been successful, a new signed certificate has been accepted, a new public key activated, and the old public key revoked, that the computing device 100 under the control of processor 110 may transmit an acknowledgment message to the server 200, such that the server 200 can maintain records that the remote computing device 100 is now utilizing the new signed certificate and the new public key for authentication purposes.

Figure 5:
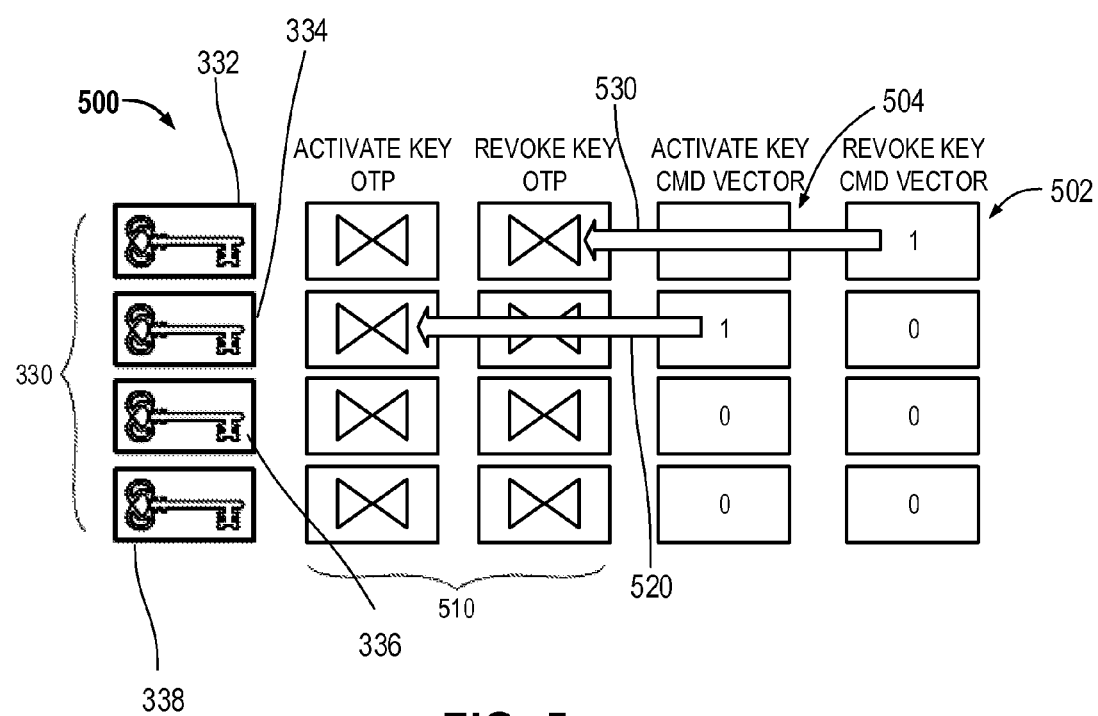
FIG. 5 is a diagram illustrating revoking a public key.

With additional reference to FIG. 5, an illustration of revoking the previously used pre-stored public key will be illustrated. As will be described, in one embodiment, processor 110 may command that a hardware fuse associated with the previously used pre-stored public key be blown. As can be seen in the example of FIG. 5, a system 500 may be implemented, in which, the four public keys 330 (e.g., public key 1 332; public key 2 334; public key 3 336; public key 4 338) may be implemented in a hardware design 510, in which, each key is either an active key, a revoked key, or an inactive key. As an example, active keys, revoked keys, or inactive keys may be implemented via one time programmable (OTP) memories. In this example, as will be described, public key 1 332 may be revoked, public key 2 334 may be activated, whereas public keys 336 and 338 may remain inactive. In this way, the state of each key (e.g., active, revoked, inactive) is stored by each OTP block. In this example, as has been previously described, a revoke key command vector 502 set to one may be set in which the public key 1 332 is revoked, which can be seen via line 530. In this instance, a hardware fuse associated with the previously used pre-stored public key 1 332 is blown. In this instance, the previously used pre-stored public key 1 332 may never be used again. This may be based upon the new pre-stored public key 2 334 being activated via an activate key command vector 504 set to one, in which case public key 2 334 is to be utilized for the reboot of an application on computing device 100 (see line 520). Therefore, in one example, public keys may be activated via activate key command vectors 504 and revoked via revoke key command vectors 502. Further, in the case of revoked keys, hardware fuses may be blown such that the previously used pre-stored keys may never be utilized again. It should be appreciated that the previous example utilized a root of trust of four public keys 330 (e.g., public key 1 332; public key 2 334; public key 3 336; public key 4 338) as an example implementation. However, it should be appreciated that any suitable number of keys may be utilized along with corresponding activate key commands and revoke key commands. The example of public key 1 and public key 2 being utilized are just examples. Public keys 3, 4, etc., could also be utilized. Moreover, any suitable number of available public keys may be utilized in accordance with the previously described process. Thus, the OTP blocks (sometimes referred to as eFuses) may be used to store the public keys or the digest of them in a non-modifiable way. It should be appreciated that an alternative storage means may be to utilize ROM if the keys are known and fixed at production. It should be appreciated that any suitable type of "storage device" may be utilized.

Figure 6:
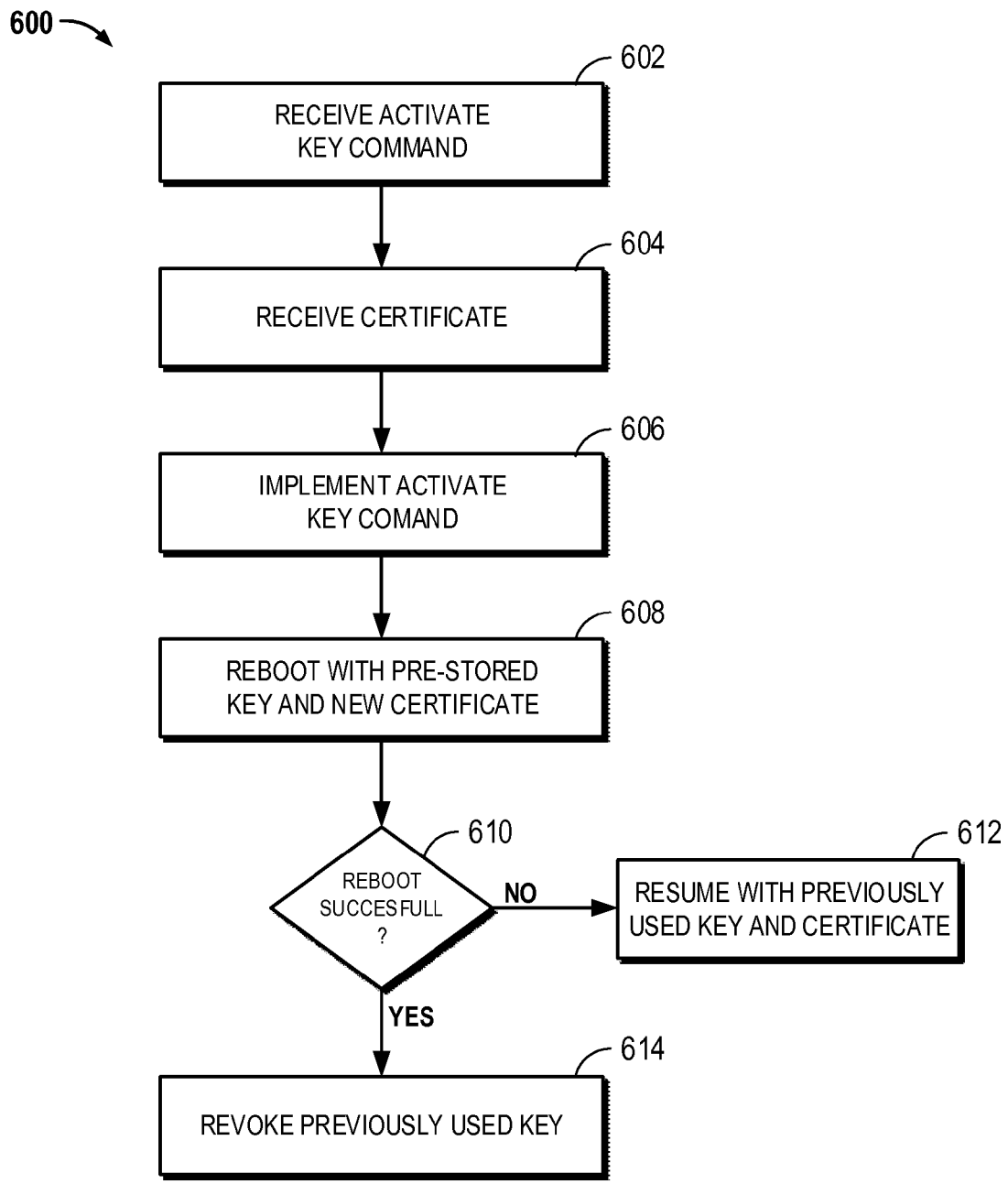
FIG. 6 is a flow diagram illustrating an example of a process to implement an activate key command.

With additional reference to FIG. 6, a method process 600 to implement embodiments previously described, will be hereinafter discussed. At Block 602, computing device 100 receives an activate key command from server 200. At Block 604, computing device 100 receives a signed certificate from server 200 associated with one of a plurality pre-stored keys stored on the computing device 100. At Block 606, computing device 100 implements the activate key command. In particular, at Block 608, computing device 100 reboots an application with a pre-stored public key and the new signed certificate. Next, at decision block 610, computing device 100 determines whether the reboot was successful. If the reboot was successful, computing device 100 revokes the previously used pre-stored public key and stores the new signed certificate and implements further reboots with the new signed certificate and the pre-stored public key (Block 614). On the other hand, if the reboot was not successful, computing device 100 is configured to resume operations with the previously used pre-stored public key and the corresponding previously used signed certificate (Block 612).

It should be appreciated that aspects of the invention previously described may be implemented in conjunction with the execution of instructions by processors (e.g., processor 110) of the devices (e.g., computing device 100), as previously described. Particularly, circuitry of the devices, including but not limited to processors, may operate under the control of a program, routine, or the execution of instructions to execute methods or processes in accordance with embodiments of the invention (e.g., the processes and functions of FIGS. 2-6). For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

It should be appreciated that when the devices are wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, 5G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a wearable device, an Internet of Things (IoT) device, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other type of computing device. These devices may have different power and data requirements.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), a system on a chip (SoC), or other programmable logic device, discrete gate or transistor logic, discrete hardware components, or any combination thereof designed to perform the functions described herein. A general purpose processor may be a microprocessor or may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in firmware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A hardware apparatus comprising:
a storage device to store a plurality of pre-stored keys;
a communication interface to receive, from a server, an activate key command and a certificate associated with one of the pre-stored keys; and
a processor coupled to the storage device and the communication interface, the processor configured to:
implement the activate key command to reboot the apparatus with the one of the pre-stored keys and the certificate received from the server that is associated with the one of the pre-stored keys;
determine if the reboot is successful,
wherein, if the reboot is not successful, the processor is configured to resume operations with a previously used pre-stored key and a corresponding previously used certificate, and,
wherein, if the reboot is successful, the processor is further configured to store the certificate for further reboots and to revoke a previously used pre-stored key.

2. The apparatus of claim 1, wherein, if the reboot is successful, the processor is further configured to issue a revoke key command to revoke the previously used pre-stored key.

3. The apparatus of claim 1, wherein, two or more of the plurality of pre-stored keys are simultaneously active, including at least a pre-stored key for activation and a pre-stored key for revocation.

4. The apparatus of claim 1, wherein the processor is further configured to prevent unauthorized activate key commands and unauthorized revoke key commands.

5. The apparatus of claim 1, wherein, revoking the previously used pre-stored key further comprises the processor commanding that a hardware fuse associated with the previously used pre-stored key be blown.

6. The apparatus of claim 1, wherein, the communication interface is a wireless interface and the activate key command is transmitted wirelessly.

7. A method comprising:
by a computing device:
receiving, from a server, a certificate associated with one of a plurality of pre-stored keys stored on the computing device and an activate key command; and
implementing the activate key command including:
rebooting the computing device with the one of the pre-stored keys and the certificate received from the server that is associated with the one of the pre-stored keys;
determining if the reboot is successful,
wherein, if the reboot is not successful, further comprising resuming operations with a previously used pre-stored key and a corresponding previously used certificate, and
wherein, if the reboot is successful, further comprising storing the certificate for further reboots and revoking a previously used pre-stored key.

8. The method of claim 7, wherein, two or more of the plurality of pre-stored keys are simultaneously active, including at least a pre-stored key for activation and a pre-stored key for revocation.

9. The method of claim 7, further comprising preventing unauthorized activate key commands and unauthorized revoke key commands.

10. The method of claim 7, wherein, revoking the previously used pre-stored key further comprises commanding that a hardware fuse associated with the previously used pre-stored key be blown.

11. The method of claim 7, wherein, the activate key command is transmitted wirelessly to the computing device from a server.

12. A non-transitory computer-readable medium including code that, when executed by a processor of a computing device, causes the processor to:
by the computing device:
receive, from a server, a certificate associated with one of a plurality of pre-stored keys stored on the computing device and an activate key command; and
implement the activate key command including:
rebooting the computing device with the one of the pre-stored keys and the certificate received from the server that is associated with the one of the pre-stored keys;
determining if the reboot is successful,
wherein, if the reboot is not successful, further comprising code to resume operations with a previously used pre-stored key and a corresponding previously used certificate, and,
wherein, if the reboot is successful, further comprising code to store the certificate for further reboots and to revoke a previously used pre-stored key.

13. The computer-readable medium of claim 12, wherein, two or more of the plurality of pre-stored keys are simultaneously active, including at least a pre-stored key for activation and a pre-stored key for revocation.

14. The computer-readable medium of claim 12, further comprising code to prevent unauthorized activate key commands and unauthorized revoke key commands.

15. The computer-readable medium of claim 12, wherein, revoking the previously used pre-stored key further comprises code to command that a hardware fuse associated with the previously used pre-stored key be blown.

16. The computer-readable medium of claim 12, wherein, the activate key command is transmitted wirelessly to the computing device from a server.

17. A computer apparatus comprising:
means for storing a plurality of pre-stored keys;
means for receiving, from a server, a certificate associated with one of the plurality of pre-stored keys and an activate key command; and
means for implementing the activate key command including:
means for rebooting the computer apparatus with the one of the pre-stored keys and the certificate received from the server that is associated with the one of the pre-stored keys;
means for determining if the reboot is successful,
wherein, if the reboot is not successful, further comprising means for resuming operations with a previously used pre-stored key and a corresponding previously used certificate, and
wherein, if the reboot is successful, further comprising means for storing the certificate for further reboots and means for revoking a previously used pre-stored key.

18. The apparatus of claim 17, wherein, two or more of the plurality of pre-stored keys are simultaneously active, including at least a pre-stored key for activation and pre-stored key for revocation.

19. The apparatus of claim 17, further comprising means for preventing unauthorized activate key commands and unauthorized revoke key commands.

* * * * *